June 2, 1953 C. WENTWORTH ET AL 2,640,918
AUTOMATIC FREQUENCY CONTROL
Filed March 9, 1950
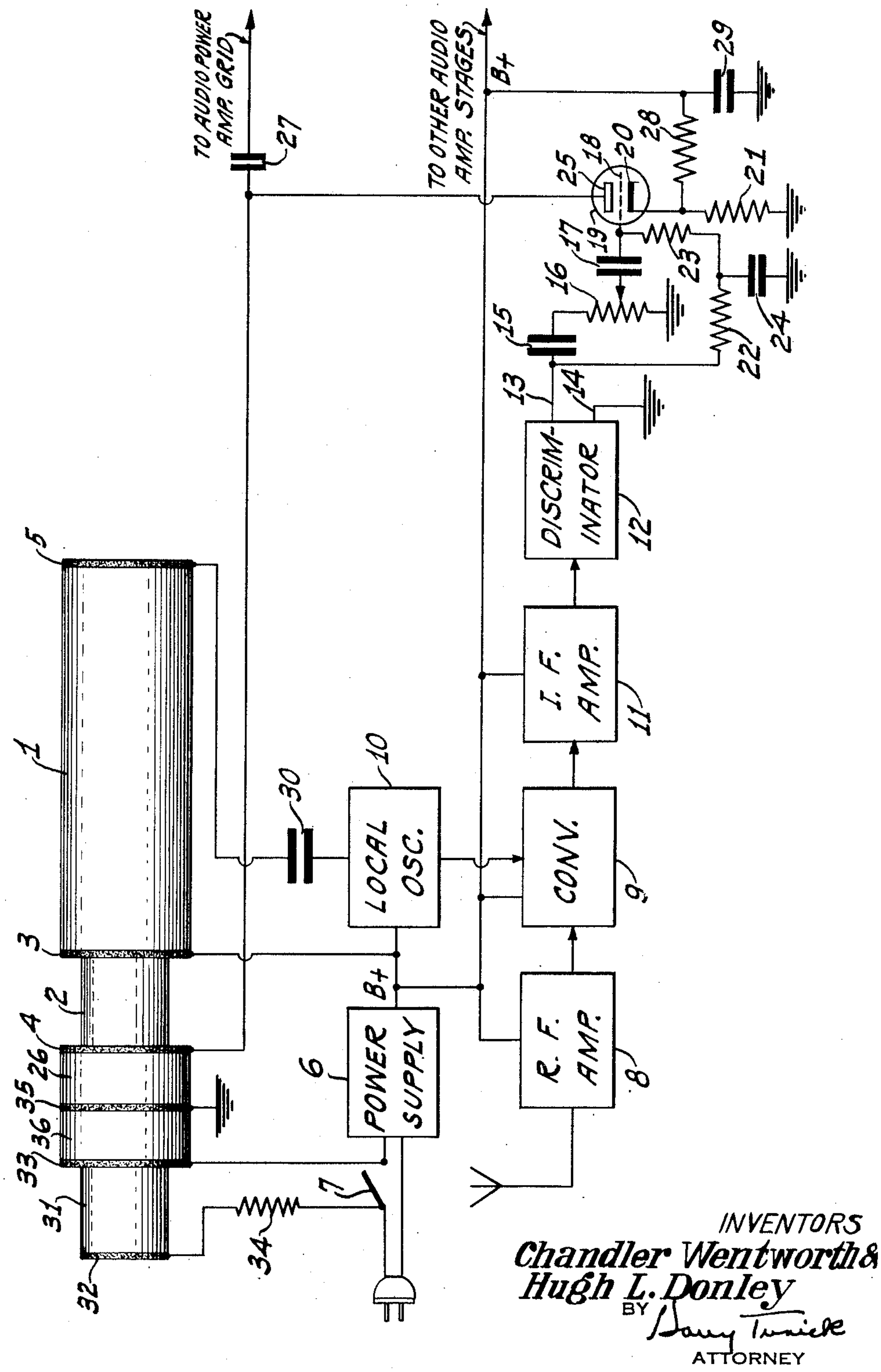
INVENTORS
Chandler Wentworth &
Hugh L. Donley
BY
ATTORNEY Patented June 2, 1953 2,640,918

UNITED STATES PATENT OFFICE 2,640,918

AUTOMATIC FREQUENCY CONTROL

Chandler Wentworth and Hugh L. Donley, Princeton, N. J., assignors to Radio Corporation of America, a corporation of Delaware Application March 9, 1950, Serial No. 148,694

9 Claims. (Cl. 250—20)

This invention relates to automatic frequency control (AFC) devices, and more particularly to thermal AFC devices which may be used in frequency modulation (FM) radio receivers or in the audio or sound channels of television (TV) receivers.

The present invention constitutes an improvement over the device disclosed in the copending Donley et al. application, Serial No. 146,166, filed February 25, 1950.

A thermal AFC device according to the aforesaid application (and also according to the present invention) comprises a high-temperature-coefficient-of-capacitance titanate dielectric in intimate thermal contact with a very small high resistance semi-conductive heater element. The first audio stage of a receiver can be used both as a control tube for the AFC unit and as an audio amplifier, the high resistance heater being used as the audio stage load resistance. The capacitance of the dielectric element rapidly follows the changes in temperature produced by the flow of direct current through the small heater element. The heater being in the first audio stage, the heater current is controlled by the D. C. component of the output of the discriminator of a FM or TV receiver; this current is therefore proportional to the frequency shift or drift of the local heterodyne oscillator. This frequency shift is automatically corrected through the change in capacitance of the temperature-responsive capacitor, such capacitance being coupled to the local oscillator circuit.

For use in a FM receiver, it is desirable to have the thermal AFC unit sufficiently slow-acting to permit the receiver to be manually tuned in a normal manner, after which the AFC action would correct any mistuning or subsequent oscillator drift. To accomplish this purpose required a thermal AFC unit which took approximately 1 minute to warm up to its operating temperature after the receiver was turned on. The warm-up time of the receiver itself, however, was only about 15–20 seconds.

One difficulty encountered when the warm-up time of the AFC unit exceeds the warm-up time of the receiver itself is that the oscillator frequency may be at one extreme of its control characteristic (corresponding to a relatively low temperature of the control capacitor) when a signal is first received, and if a signal is present at this time the resulting AFC action holds it in this undesirable position. Another manifestation of the same effect may be noticed when the FM receiver is turned on a minute or two after it has been turned off while properly tuned to one of two closely spaced signals. When turned on, the receiver may select the wrong signal.

A solution to the aforementioned difficulty is that disclosed in the aforementioned application, viz., an auxiliary heater energized from the power line when the receiver is turned off or deenergized; such an auxiliary heater is in thermal contact with the dielectric element and maintains such element at substantially its operating temperature when the receiver is deenergized. The 110-volt heating supply is removed just prior to the energizing of the regular or main heater; by using this scheme, the normal receiver warm-up time of about 15 seconds can be maintained.

An object of this invention is to devise a thermal AFC unit provided with an auxiliary heater and having in addition a shielding arrangement for preventing 60-cycle hum from being picked up by the main heater or the oscillator control capacitor, this shielding arrangement being provided without adding capacitance to the oscillator control capacitor. For best sensitivity for high frequencies, such capacitance should be kept small.

Another object is to provide a thermal AFC unit which not only serves for AFC purposes but also provides a radio frequency (RF) bypass capacitor for an audio stage. Such unit also serves as the load resistor for the first audio stage.

The foregoing and other objects and advantages of the invention will be best understood from the following description of an exemplification thereof, reference being had to the accompanying drawing, wherein the single figure is a part structural, part diagrammatic view of an AFC unit according to this invention as applied to a FM receiver of more or less conventional arrangement.

The objects of this invention are accomplished, briefly, in the following manner: A main heater and also an auxiliary heater are placed in thermal contact with a dielectric element composed of titanate material. The auxiliary heater is arranged to heat the dielectric element during periods of deenergization of the FM receiver in which the element is being used, to thereby maintain such element at substantially its operating temperature during such periods; the main heater is responsive to the output of the discriminator to vary the temperature of the element to provide AFC during periods of energization of the receiver. A grounded metallic shield is provided between the auxiliary heater and the main heater-capacitor portion of the AFC unit, this shield being a part of the AFC unit; a dielectric body is provided, as a part of the AFC unit, between the grounded shield and the main heater, to serve as an audio stage RF bypass.

Now referring to the drawing, a dielectric element 1, illustrated for convenience as being of substantially cylindrical configuration, serves as the temperature-responsive capacitor used to control the local oscillator frequency of the FM receiver. In accordance with the disclosure in the aforesaid copending application, element 1 is composed of a mixture of barium and strontium titanates which will provide for such element a very high temperature-coefficient-of-capacitance as well as a high dielectric factor, the composition of such mixture being varied to give the desired predetermined Curie temperature or Curie point. As a typical example, element 1 may be composed of 70% barium titanate and 30% strontium titanate. It is element 1 which is utilized for AFC of the local oscillator in the FM receiver, the capacitance of this element changing due to changes in the temperature thereof and the capacitance of such element being coupled directly into the tank circuit of the local oscillator. The dimensions of element 1 are quite small; as an example, this element may have a diameter of 60 mils and a length of $\frac{3}{16}$ inch.

Positioned coaxially with element 1 is a main heater element 2, illustrated for convenience as being of substantially cylindrical configuration, this heater element being in intimate thermal contact with element 1 and serving as the controllable heating means (controlled by the D. C. component of the output of the FM receiver's discriminator) which varies the temperature of element 1 in dependence upon frequency changes in the frequency being controlled, which is the input to the discriminator. In accordance with the disclosure in the aforesaid copending application, heater element 2 may be composed of a magnetite-barium strontium titanate mixture which will provide the desired high resistance per unit volume so that this heater can be made the plate load resistor of a vacuum tube, the composition of this mixture being varied to give the desired predetermined resistivity. As a typical example, element 2 may be composed of 30% magnetite and 70% 70/30 barium strontium titanate. The dimensions of heater element 2 are also quite small; as an example, this element may have a diameter of 40 mils and a length of 40 mils.

Element 1 is provided with fired-on silver electrodes 3 and 5, one of which covers each circular end face of such element. These electrodes may be obtained by firing at an elevated temperature a silver paste applied to such faces. In order to fasten elements 1 and 2 together in intimate thermal contact, heater element 2 and capacitive element 1 are sweated together end-to-end at electrode 3 with a small amount of soft solder.

Positioned coaxially with elements 1 and 2, at the end of element 2 opposite to element 1, is a dielectric element 26, illustrated for convenience as being of substantially cylindrical configuration, which serves as a RF bypass capacitor for the first audio stage of the FM receiver, as will hereinafter appear. Element 26 can be composed of the same titanate mixture as is element 1. Capacitive element 26 is also of small dimensions and may, for example, have a diameter of 60 mils and a length of 30 mils. The end faces of element 26 are provided with fired-on silver electrodes 4 and 35, heater element 2 and element 26 being sweated together end-to-end at electrode 4 with soft solder. Electrode 35 is grounded to provide the shield hereinafter referred to.

Positioned coaxially with elements 26, 2 etc. so far described at the end of element 26 opposite to element 2, is a dielectric element 36, illustrated for convenience as being of substantially cylindrical configuration which serves as an insulator, as will later be described. Element 36 can be composed of the same titanate material as elements 1 and 26. Insulating element 36 is also of small dimensions and may, for example, be of the same dimensions as element 26, viz., diameter 60 mils and length 30 mils. Dielectric elements 26 and 36 are sweated together end-to-end at electrode 35, and at its other end element 36 is provided with a fired-on silver electrode 33.

Positioned coaxially with the elements so far described, at the end of element 36 opposite to element 26, is an auxiliary heater element 31, illustrated for convenience as being of substantially cylindrical configuration, this heater element being fastened in intimate thermal contact with element 36 by being sweated to the end of element 36 at electrode 33. Heater element 31 can be composed of the same magnetite-barium strontium titanate mixture as is heater 2 and functions to maintain capacitive element 1 at substantially its operating temperature when the FM receiver is deenergized. Element 31 may have the same dimensions as element 2, viz., diameter 40 mils and length 40 mils. At its exposed end, heater element 31 is provided with a fired-on silver electrode 32 which covers its circular end face.

The time constant of any thermal device depends on its thermal capacity or roughly on the mass of the device. For use in a FM receiver, it is desirable to have the AFC unit sufficiently slow-acting to permit the receiver to be manually tuned in a normal manner, after which the AFC action would correct any mistuning or subsequent oscillator drift. Although a capacitive element 1 having the dimensions given as an example is sufficiently slow-acting to permit the FM receiver to be manually tuned in a normal fashion, the warm-up time of the AFC unit itself is about one minute. The dimensions of the dielectric element 1 and heater element 2 previously stated were found to give about the right mass of unit to provide a control time (the time required for the AFC to retune the receiver) of roughly 10–15 seconds.

The drawing illustrates, partly schematically, the application of the thermal unit previously described to a FM receiver. A power supply 6, energized from the power line through a series power switch 7, supplies plate voltage to all tubes of the receiver, the plate voltage lead being labeled B+. The heaters of all tubes are energized when switch 7 is closed. The receiver includes in cascade a R. F. amplifier 8, a converter stage 9 to which is supplied heterodyning energy from a local oscillator 10, I. F. amplifier 11 and a discriminator or ratio detector 12 which has a pair of output leads 13 and 14. lead 14 being grounded. When the receiver is in operation, the discriminator 12 will, at any instant of time, supply voltages across leads 13 and 14 which include a D. C. component. This component, unless it is of zero magnitude, will have some finite positive or negative value. The magnitude and polarity of this component are responsive to changes in frequency, from a predetermined value, of the mean signal frequency fed to discriminator 12.

Across leads 13 and 14 will also appear, as is well-known to those skilled in the art, audio frequency modulating voltages. The audio frequency voltages are applied over condenser 15, volume control potentiometer 16 and condenser 17 to the grid 18 of the first audio stage tube 19 the cathode 20 of which is grounded through resister 21. The D. C. component of the discriminator output voltage is applied through resistors 22 and 23 to control grid 18 of tube 19, which is thus used as a D. C. amplifier or control tube, the resistors 22 and 23 being connected in series between output lead 13 and grid 18; an audio bypass condenser 24 is connected from ground to a point between resistors 22 and 23. Plate 25 of tube 19 is connected to main heater electrode 4 of heater 2, while heater electrode 3 is connected to the B supply; in this way, the plate load resistance or output resistance of tube 19 is the main heater 2 of the AFC unit.

Since electrode 4 is connected to plate 25 and electrode 35 is connected to ground, dielectric section 26 is connected from plate to ground of the first audio stage 19. This section therefore functions as the RF bypass capacitor which is normally present (and required) at the plate of the first audio stage. With the dimensions of element 26 previously stated, the capacitance of this capacitor is 200–300 mmfd., a value such as usually used. It will be noted that the additional capacitor 26 is provided without the addition of capacitance to the main (thermal) capacitor 1. Due to the fact that capacitor 26 is made of a material having a very large dielectric constant, sufficient capacitance may be obtained with a capacitor of very small size.

The amplified audio frequency voltage is coupled through condenser 27 to the grid of the following audio stage.

Fixed bias is applied to the cathode 20 by means of a bleeder resistor 28 from the positive supply lead in combination with resistor 21, a R. F. bypass condenser 29 being connected from such positive lead to ground. Resistor 28 is used to set the initial or operating bias on tube 19 such that the initial plate current through the main heater 2 (when the receiver is energized) maintains the operating temperature of the capacitor 1 well above ambient temperature when there is a zero or correct tuning point control voltage out of discriminator 12, thereby eliminating the necessity for careful thermal shielding of the element.

The capacitance element 1 is connected to the tank circuit of oscillator 10 by a lead extending from electrode 5 through a series capacitor 30 to the plate of the tube in oscillator 10. By virtue of the R. F. bypass condenser 29 connected to electrode 3, the capacitance of the element 1 between the opposite electrodes 3 and 5 appears in effect between electrode 5 and ground.

Assume that when the FM receiver is first energized by closing switch 7, the capacitor 1 is essentially or substantially at its operating temperature; that this is a proper assumption will hereinafter appear. The titanate capacitor-heater unit 1, 2 is then ready to function as a frequency control for the oscillator 10 when the receiver is first operative, which may be within 15 seconds after the receiver was turned on if such receiver has a warm-up time of 15 seconds.

The tube capacitances and circuit constants of the oscillator 10 will continue to change for some time after the receiver is turned on, to thereby cause the D. C. component of the discriminator output voltage to vary from zero. If the discriminator output voltage polarity with regard to frequency change has been correctly predetermined, this change in discriminator output voltage will cause the temperature of the titanate capacitor 1 to change in the proper direction to counteract the change in other circuit components of the oscillator 10. For example, if the discriminator polarity is such that an increase in the mean I. F. supplied thereto applies a negative voltage to grid 18 to reduce the heater 2 current, the temperature of the capacitor 1 will decrease and the capacitance of such capacitor will increase, thus decreasing the frequency of the local oscillator 10; this change is in the correct direction to counteract the original slow change in mean I. F.

Because of the control time or time constant of the AFC unit (10–15 seconds) the manual tuning process is similar to one with no AFC; thus, the operator can immediately tune in a station and the AFC action will compensate for tendencies of the oscillator 10 to drift. If when the receiver is first operative the tuning point is nearly correct for a particular station, the AFC action will correct the tuning of the oscillator in the proper direction to tune to the station.

As hereinbefore set forth and as described in the aforementioned copending application, certain difficulties which normally ensue, when the warm-up time of the AFC capacitor exceeds the warm-up time of the FM receiver, are solved satisfactorily by the provision of an auxiliary heater, in thermal contact with the capacitor 1, which maintains such capacitor substantially at its operating temperature when the receiver is denergized. Such an auxiliary heater is denoted by numeral 31 and has previously been described.

In order to energize the auxiliary heater 31 in such a way that the heater draws a small amount of current from the 110-volt A. C. power line when the power is off in the receiver, thereby to maintain element 1 at its operating temperature while the receiver is off, a lead extends from one side of power switch 7 to auxiliary heater electrode 33 and a lead extends from the other side of switch 7 (through a series resistor 34 if desired, to apply only an adjustable portion of the 110 volts to heater 31) to auxiliary heater electrode 32. Instead of a series resistor 34, a series capacitor can be used if desired.

When the receiver is off (switch 7 open) auxiliary heater 31 is energized from the 110-volt line to maintain element 1 substantially at its operating temperature. When the receiver is energized, the on-off switch 7 is closed, shunting out the auxiliary heater 31 and thereby removing the 110-volt supply from such heater just prior to the energization of the regular or main heater 2. Consequently, when the power switch 7 of the receiver is closed, the AFC capacitor 1 is already at operating temperature while the current through the main heater 2 is rising to its predetermined operating value. The use of the auxiliary heater 31 therefore eliminates the time delay which would otherwise occur in the control capacitor's reaching its operating temperature, so that as soon as the normal warm-up time of the receiver has passed (this warm-up time being, for example, 15 seconds from the energization of the receiver) the AFC unit operates or assumes control and thereafter controls the oscillator frequency. Tests with such a unit installed in a FM receiver of applicants' assignee's manufacture showed that the station to which the receiver was tuned when such receiver was deenergized would also be the one automatically selected when it was energized. Since the auxiliary heater 31 is separated from the oscillator control capacitor 1 by the two dielectric elements 36, 26 as well as the main heater 2, the heat produced by the auxiliary heater 31 is conducted to the control capacitor 1 at a slower rate than is heat produced by the main heater 2. In fact, the auxiliary heater 31 requires about three times as much current as does the main heater 2 to get the capacitor element 1 to the same operating temperature. However, since the dimensions and power requirements of the whole AFC unit are very small, the above objection is of little concern, because the auxiliary heater merely provides enough heat (derived from power taken from the line), when the power switch 7 is open, to maintain the control capacitor 1, as well as the main heater 2, at the desired operating temperature. In spite of the greater auxiliary heater current requirements, only about 0.2 watt was needed from the power line to maintain the AFC unit in "stand-by" condition. Although there is a closed series circuit from the power line to power supply 6 through auxiliary heater 31 when switch 7 is open, this is a very high resistance circuit and the amount of current flowing therethrough (e. g., 2 ma. as compared to at least 500 ma. when switch 7 is closed to energize the receiver) is entirely insufficient to produce any energization of the rectifiers in power supply 6 at this time.

The presence of 60-cycle voltage at the terminals of auxiliary heater 31 (and particularly at electrode 33, even when switch 7 is closed) requires shielding this auxiliary heater both from the main heater 2 (which serves as the first audio stage plate resistor) and from the oscillator control capacitor 1. Electrode 35, being grounded to the receiver chassis, acts as a shield to prevent 60-cycle hum from appearing across the main heater or across the control capacitor 1. Locating the shield 35 as shown shields the auxiliary heater 31 from the audio portion 2 and from the R. F. portion 1 of the unit without adding capacitance to the capacitor section 1 which controls the oscillator frequency. For best sensitivity at high frequency, this capacitance should be kept small.

As previously stated, locating the shield as illustrated provides dielectric section 26 which serves as a R. F. bypass condenser for the first audio stage. The second dielectric section 36 is necessary because the power line, which energizes the auxiliary heater 31, does not normally have one side directly connected to the chassis ground.

To summarize, the AFC unit of this invention not only serves for AFC purposes, but also as the first audio stage load resistor and R. F. bypass. The addition of the small high resistance auxiliary heater 31 consuming a negligible amount of power from the A. C. power line makes possible a rapid warm-up time FM receiver with AFC action which causes no confusion to the person tuning the receiver. It will be appreciated that the AFC unit is shown greatly exaggerated in size in the drawing, for purposes of clarity.

What we claim to be our invention is:

1. In a radio receiver, signal-responsive means for producing an output voltage in response to a slow change, from a predetermined frequency, in the frequency of the signal fed thereto, a controllable-frequency generator in said receiver for varying the frequency of the signal fed to said means, a capacitive element the capacitance of which varies with the temperature thereof, a main electrical heater element in intimate thermal contact with said capacitive element, means responsive to said produced voltage for controlling the current through said heater element, means coupling said capacitive element to said generator, the arrangement being such that the frequency of said generator is controlled, thereby varying the frequency of the signal fed to said signal-responsive means, in response to variations in capacitance of said capacitive element, an auxiliary heater element spaced from said main heater element and in intimate thermal contact with said capacitive element, means for causing energization of said auxiliary heater element in response to deenergization of said receiver, a dielectric element interposed between said main and auxiliary heater elements, and means for utilizing the capacitance provided by said dielectric element as a radio frequency bypass capacitor in said receiver.

2. In a radio receiver adapted to be energized at will from a source of power through a switch, signal-responsive means operative in response to closing of said switch to produce an output voltage in response to a slow change, from a predetermined frequency, in the frequency of the signal fed thereto, a controllable-frequency generator in said receiver for varying the frequency of the signal fed to said means, a capacitive element the capacitance of which varies with the temperature thereof, a main electrical heater element in intimate thermal contact with said capacitive element, means responsive to said produced voltage for controlling the current through said heater element, means coupling said capacitive element to said generator, the arrangement being such that the frequency of said generator is controlled, thereby varying the frequency of the signal fed to said signal-responsive means, in response to variations in capacitance of said capacitive element, an auxiliary electrical heater element spaced from said main heater element and in intimate thermal contact with said capacitive element, means connecting said auxiliary heater element across said switch, a dielectric element interposed between said main and auxiliary heater elements, and means for utilizing the capacitance provided by said dielectric element as a radio frequency bypass capacitor in said receiver.

3. In a radio receiver adapted to be energized at will from a source of power through a switch, signal-responsive means operative in response to closing of said switch to provide an output voltage in response to a slow change, from a predetermined frequency, in the frequency of the signal fed thereto, a controllable-frequency generator in said receiver for varying the frequency of the signal fed to said means, a capacitive element the capacitance of which varies with the temperature thereof, a main electrical heater element in intimate thermal contact with said capacitive element, means responsive to said produced voltage for controlling the current through said heater element, means coupling said capacitive element to said generator, the arrangement being such that the frequency of said generator is controlled, thereby varying the frequency of the signal fed to said signal-responsive means, in response to variations in capacitance of said capacitive element, an auxiliary electrical heater element spaced from said main heater element and in intimate thermal contact with said capacitive element, means connecting said auxiliary heater element across said switch, a metallic shield connected to a point of zero reference potential, said shield having said auxiliary heater element on one side thereof and said main heater element and said capacitive element on the other side thereof, a dielectric element interposed between said main and auxiliary heater elements, and means for utilizing the capacitance provided by said dielectric element as a radio frequency bypass capacitor in said receiver.

4. In a radio receiver adapted to be energized at will from a source of power through a switch, signal-responsive means operative in response to closing of said switch to provide an output voltage in response to a slow change, from a predetermined frequency, in the frequency of the signal fed thereto, a controllable-frequency generator in said receiver for varying the frequency of the signal fed to said means, a capacitive element the capacitance of which varies with the temperature thereof, a main electrical heater element in intimate thermal contact with said capacitive element, means responsive to said produced voltage for controlling the current through said heater element, means coupling said capacitive element to said generator, the arrangement being such that the frequency of said generator is controlled, thereby varying the frequency of the signal fed to said signal-responsive means, in response to variations in capacitance of said capacitive element, an auxiliary electrical heater element spaced from said main heater element and in intimate thermal contact with said capacitive element, means connecting said auxiliary heater element across said switch, a metallic shield connected to a point of zero reference potential, said shield having said auxiliary heater element on one side thereof and said main heater element and said capacitive element on the other side thereof, an insulating element interposed between said auxiliary heater element and said shield, a dielectric element interposed between said shield and said main heater element, and means for utilizing the capacitance provided by said dielectric element as a radio frequency bypass capacitor in said receiver.

5. In a radio receiver, signal-responsive means for producing a direct output voltage in response to a slow change, from a predetermined frequency, in the frequency of the signal fed thereto, a controllable-frequency generator in said receiver for varying the frequency of the signal fed to said means, a capacitive element the capacitance of which varies with the temperature thereof, a main electrical heater element in intimate thermal contact with said capacitive element, a direct current amplifier stage having an input circuit coupled to the output of said means and having an output circuit, means coupling said heater element to said output circuit as the output load resistor for said stage, to thereby control the temperature of said capacitive element in dependence upon the direct voltage output of said first-named means, means coupling said capacitive element to said generator, the arrangement being such that the frequency of said generator is controlled, thereby varying the frequency of the signal fed to said first-named means, in response to variations in capacitance of said capacitive element, an auxiliary heater element spaced from said main heater element and in intimate thermal contact with said capacitive element, a dielectric element interposed between said main and auxiliary heater elements, and means for utilizing the capacitance provided by said dielectric element as a radio frequency bypass capacitor in said amplifier stage.

6. In a radio receiver, signal-responsive means for producing a direct output voltage in response to a slow change, from a predetermined frequency, in the frequency of the signal fed thereto, a controllable-frequency generator in said receiver for varying the frequency of the signal fed to said means, a capacitive element the capacitance of which varies with the temperature thereof, a main electrical heater element in intimate thermal contact with said capacitive element, a direct current amplifier tube having a grid coupled to the output of said means and having a plate circuit, means coupling said heater element to said plate circuit as the plate load resistor for said tube, to thereby control the temperature of said capacitive element in dependence upon the direct voltage output of said first-named means, means coupling said capacitive element to said generator, the arrangement being such that the frequency of said generator is controlled, thereby varying the frequency of the signal fed to said first-named means, in response to variations in capacitance of said capacitive element, an auxiliary heater element spaced from said main heater element and in intimate thermal contact with said capacitive element, a dielectric element interposed between said main and auxiliary heater elements, and means for utilizing the capacitance provided by said dielectric element between the plate of said tube and a point of zero reference potential.

7. In a radio receiver adapted to be energized at will from a source of power through a switch, signal-responsive means operative in response to closing of said switch to produce a direct output voltage in response to a slow change, from a predetermined frequency, in the frequency of the signal fed thereto, a controllable-frequency generator in said receiver for varying the frequency of the signal fed to said means, a capacitive element the capacitance of which varies with the temperature thereof, a main electrical heater element in intimate thermal contact with said capacitive element, a direct current amplifier stage having an input circuit coupled to the output of said means and having an output circuit, means coupling said heater element to said output circuit as the output load resistor for said stage, to thereby control the temperature of said capacitive element in dependence upon the direct voltage output of said first-named means, means coupling said capacitive element to said generator, the arrangement being such that the frequency of said generator is controlled, thereby varying the frequency of the signal fed to said first-named means, in response to variations in capacitance of said capacitive element, an auxiliary electrical heater element spaced from said main heater element and in intimate thermal contact with said capacitive element, means connecting said auxiliary heater element across said switch, a dielectric element interposed between said main and auxiliary heater elements, and means for utilizing the capacitance provided by said dielectric element as a radio frequency bypass capacitor in said amplifier stage.

8. In a radio receiver adapted to be energized at will from a source of power through a switch, signal-responsive means operative in response to closing of said switch to produce a direct output voltage in response to a slow change, from a predetermined frequency, in the frequency of the signal fed thereto, a controllable-frequency generator in said receiver for varying the frequency of the signal fed to said means, a capacitive element the capacitance of which varies with the temperature thereof, a main electrical heater element in intimate thermal contact with said capacitive element, a direct current amplifier stage having an input circuit coupled to the output of said means and having an output circuit, means coupling said heater element to said output circuit as the output load resistor for said stage, to thereby control the temperature of said capacitive element in dependence upon the direct voltage output of said first-named means, means coupling said capacitive element to said generator, the arrangement being such that the frequency of said generator is controlled, thereby varying the frequency of the signal fed to said first-named means, in response to variations in capacitance of said capacitive element, an auxiliary electrical heater element spaced from said main heater element and in intimate thermal contact with said capacitive element, means connecting said auxiliary heater element across said switch, a metallic shield connected to a point of zero reference potential, said shield having said auxiliary heater element on one side thereof and said main heater element and said capacitive element on the other side thereof, a dielectric element interposed between said main and auxiliary heater elements, and means for utilizing the capacitance provided by said dielectric element as a radio frequency bypass capacitor in said amplifier stage.

9. In a radio receiver adapted to be energized at will from a source of power through a switch, signal-responsive means operative in response to closing of said switch to provide a direct output voltage in response to a slow change, from a predetermined frequency, in the frequency of the signal fed thereto, a controllable-frequency generator in said receiver for varying the frequency of the signal fed to said means, a capacitive element the capacitance of which varies with the temperature thereof, a main electrical heater element in intimate thermal contact with said capacitive element, a direct current amplifier tube having a grid coupled to the output of said means and having a plate circuit, means coupling said heater element to said plate circuit as the plate load resistor for said tube, to thereby control the temperature of said capacitive element in dependence upon the direct voltage output of said first-named means, means coupling said capacitive element to said generator, the arrangement being such that the frequency of said generator is controlled, thereby varying the frequency of the signal fed to said first-named means, in response to variations in capacitance of said capacitive element, an auxiliary electrical heater element spaced from said main heater element and in intimate thermal contact with said capacitive element, means connecting said auxiliary heater element across said switch, a metallic shield connected to a point of zero reference potential, said shield having said auxiliary heater element on one side thereof and said main heater element and said capacitive element on the other side thereof, an insulating element joined to said auxiliary heater element and said shield and interposed therebetween, a dielectric element joined to said shield and said main heater element and interposed therebetween, and means connecting the main-heater end of said dielectric element to the plate of said tube, to thereby utilize the capacitance provided by said dielectric element between the plate of said tube and a point of zero reference potential, as a radio frequency bypass capacitor.

CHANDLER WENTWORTH.
HUGH L. DONLEY.

References Cited in the file of this patent

UNITED STATES PATENTS

| Number | Name | Date |
|---|---|---|
| 1,894,687 | Hyland | Jan. 17, 1933 |
| 2,126,027 | Muth et al. | Aug. 9, 1938 |
| 2,210,406 | Henderson | Aug. 6, 1940 |
| 2,483,070 | Spindler | Sept. 27, 1949 |